United States Patent
Hottle

[15] 3,704,082
[45] Nov. 28, 1972

[54] SEGMENTED TIRE MOLD HAVING HINGED ARCUATE TREAD SECTORS

[72] Inventor: Dwight E. Hottle, 2866 Lakeland Parkway, Cuyahoga Falls, Ohio 44224

[22] Filed: Oct. 19, 1970

[21] Appl. No.: 81,688

[52] U.S. Cl. ..................................425/46, 425/45
[51] Int. Cl. ................................................B29h 5/02
[58] Field of Search.........18/17 K, 17 W, 17 T, 42 T, 18/44; 249/171, 172, 50; 25/121 R, 121 F

[56] References Cited

UNITED STATES PATENTS

| | | | |
|---|---|---|---|
| 1,179,898 | 4/1916 | Coffey et al. | 18/17 K UX |
| 3,460,197 | 8/1969 | Cantarutti et al. | 18/17 K X |
| 3,171,163 | 3/1965 | Ford et al. | 25/121 R X |
| 3,097,397 | 7/1963 | Leach et al. | 249/171 |

FOREIGN PATENTS OR APPLICATIONS

| | | | |
|---|---|---|---|
| 771,553 | 11/1967 | Canada | 18/17 K |
| 1,169,118 | 4/1964 | Germany | 18/17 W |

*Primary Examiner*—J. Howard Flint, Jr.
*Attorney*—Freeman & Taylor

[57] ABSTRACT

A three-piece segmented tire mold including opposed sidewall mold sections that are movable toward and away from each other for molding the sidewall portions of a pneumatic tire, and further including a series of arcuate tread mold sectors adapted to register with the opposed sidewall mold sections and with the arcuate tread sectors being hinged to one of said mold sections so as to be movable around a fixed hinge point for the purpose of receiving a tire and subsequently permitting removal of the same following vulcanization.

2 Claims, 9 Drawing Figures

FIG. I

INVENTOR.
DWIGHT E. HOTTLE
BY Freeman & Taylor
ATTORNEYS

INVENTOR.
DWIGHT E. HOTTLE
BY
Freeman + Taylor
ATTORNEYS

INVENTOR.
DWIGHT E. HOTTLE
BY Freeman + Taylor
ATTORNEYS

3,704,082

SEGMENTED TIRE MOLD HAVING HINGED ARCUATE TREAD SECTORS

BACKGROUND OF THE INVENTION

This invention relates to the art of pneumatic tire manufacture and in particular relates to the art of final vulcanization wherein tires are cured to their final form by being positioned in a curing mold and subjected to vulcanization temperature and pressure.

Vulcanization of pneumatic tires by the general use of molds in the manner above-described has long been known in the art.

For some time past, tires of this type have been vulcanized by the use of two-part molds wherein the mold halves meet at the longitudinal or center line of the tire so as to form a flash point in the mid-portion of the tread region of the tire.

While tire molds of this type have long been known, the same have been found to possess certain disadvantages.

First, the presence of flash in tire molding operations of this type is very difficult, if not impossible, to avoid and as a result in the use of two-part molds, this flash occurs in the mid-section of the tread region which is highly disadvantageous from an appearance and performance standpoint.

Second, with the advent of radial ply belted tires including high-strength cord members, it has been found difficult to remove such tires from the mold due to the inability of the same to be broken away from the mold especially in the tread region thereof.

It was for the foregoing reasons that segmented tire molds, featuring three-mold sections, were introduced to the art. In segmented molds of the three-part type, normally one mold section is employed to provide one side wall surface of the tire, another mold is used to provide the opposed sidewall surface of the tire, and an expandable, articulated tread mold sector is employed to provide the tread section of the tire. By virtue of the expandable nature of this type of mold, removal of the tires from the mold is greatly facilitated.

DESCRIPTION OF THE PRIOR ART

Prior art patents illustrating segmented mold constructions of the type above-discussed are believed to be represented in the following U.S. Pat. NOS.

| | |
|---|---|
| Doughty | U.S. Pat. No. 1,101,732 |
| Finlayson | U.S. Pat. No. 1,132,250 |
| Doughty | U.S. Pat. No. 1,260,990 |
| Shrum et al. | U.S. Pat. No. 1,475,032 |
| Balle | U.S. Pat. No. 3,082,480 |
| Pacciarini et al. | U.S. Pat. No. 3.337.918 |
| Balle et al. | U.S. Pat. No. 3,396,221 |
| Cantarutti et al. | U.S. Pat. No. 3,460.197 |
| Turk et al. | U.S. Pat. No. 3,461,502 |

SUMMARY OF THE INVENTION

The present invention envisions hinging the tread mold sectors adjacent one axial edge thereof to one of the sidewall mold sections. By this arrangement a fixed pivot point is provided and by use of a piston, for example, secured adjacent to the remaining axial edge of each sector, the arcuate tread mold sectors can be pivoted into and out of molding position.

The present invention, utilizing structure of the type above-described, provides at least three distinct advantages over the known prior art.

First, and by virtue of the fact that the tread mold sectors will preferably include radially inward extensions that define the shoulder area of the tire, a pre-positioning of the green tire within the mold is achieved. By this pre-positioning it will be assured that the green tire is not cocked so that the mid-point thereof will be aligned with true horizontal in all instances.

Second, by use of this structure, radial registry of the arcuate sectors at their arcuate ends will be possible because of the fact that these will be self-aligning, with the result that lesser machine tolerances may be required.

As a third advantage it will be noted that by virtue of this pivoting construction and the extension of the tread mold sectors down into the crown region of the tire, that when molding is completed and it is desired to remove the tire that then, in that event, the crown molding portion will serve in effect as a pry bar to separate the cured tire from the remaining portions of the mold.

Production of an improved segmented tire mold having the above-described features accordingly becomes the principal object of this invention, with other objects thereof becoming more apparent upon a reading the following brief specification considered and interpreted in view of the accompanying drawings.

OF THE DRAWINGS

DESCRIPTION OF THE PREFERRED EMBODIMENT

Figure 1:
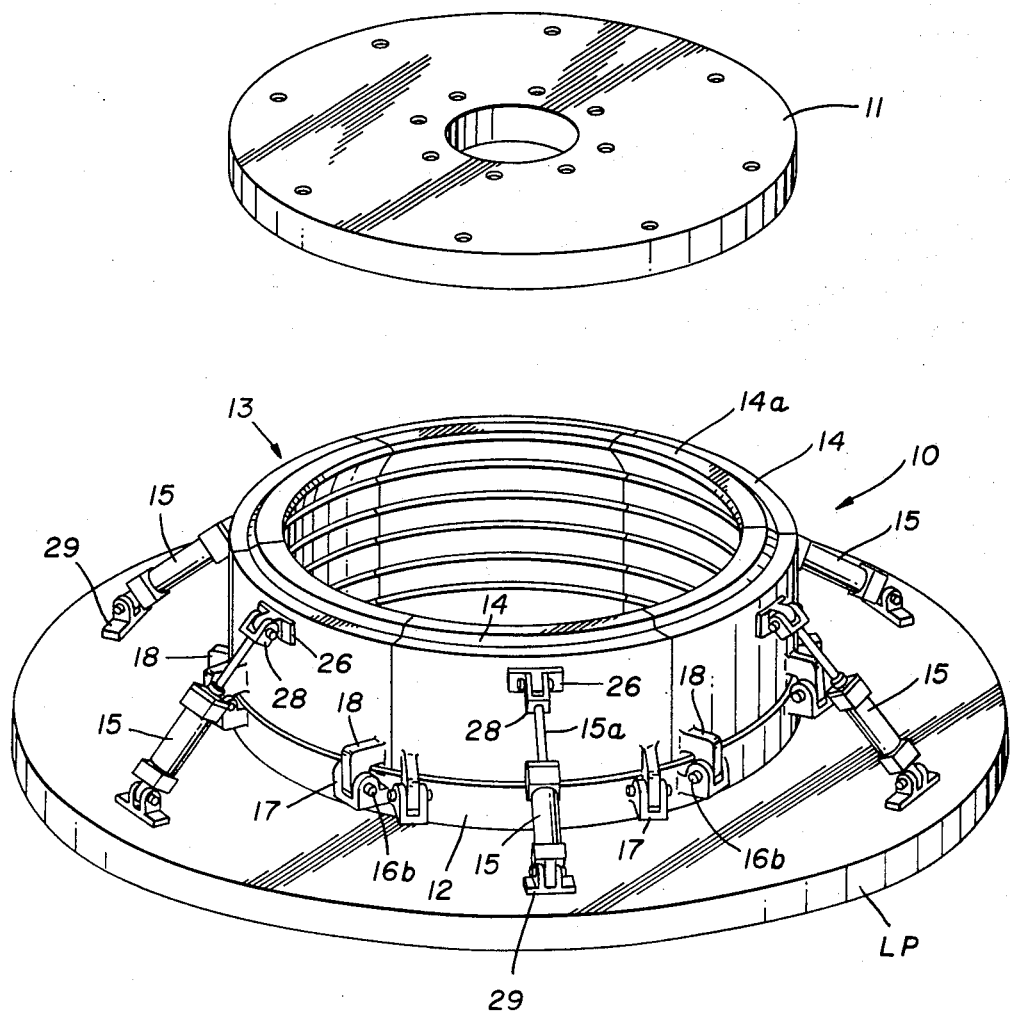
FIG. 1 is a perspective view illustrating the improved segmented mold in closed position, with the top mold section being separated therefrom.
Figure 2:
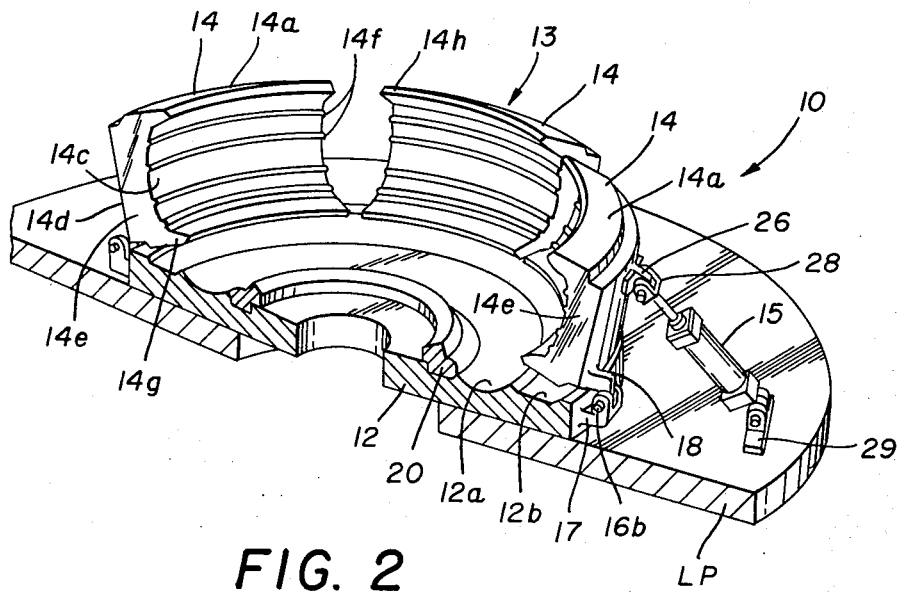
FIG. 2 is a similar perspective view but being partly broken away in section and showing the tread mold sectors in their open position.

Referring now to the drawings and in particular to FIG. 1 thereof, the improved segmented mold, generally designated by the numeral 10, includes an upper mold section 11, a lower mold section 12, and an articulated tread mold 13, with the tread mold section 13 being made up of individual tread mold sectors 14,14 that are hinged between open and closed position by virtue of pistons 15,15, as clearly shown in FIGS. 1 and 2 of the drawings.

In this regard, such pivotal movement by the piston 15,15 is effectuated around fixed pivot points 16,16 that serve as a point of connection between a series of lugs 17,17 carried by the lower mold section 12, and a coacting series of lugs 18,18 respectively carried by each tread mold sector 15.

Figure 6:
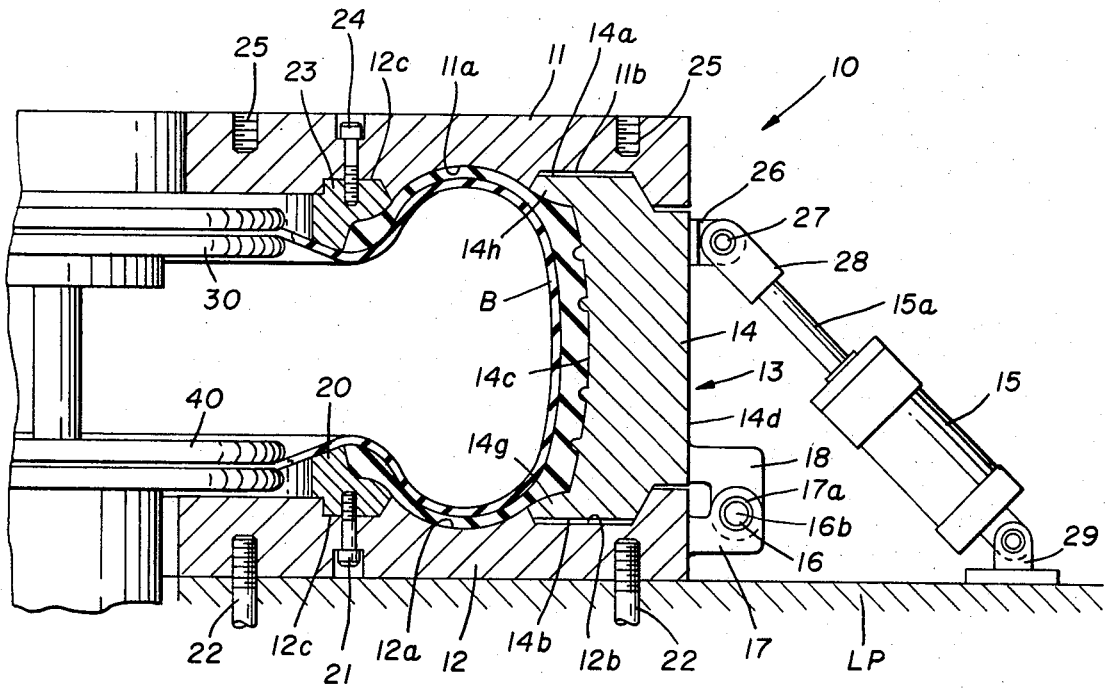
FIG. 6 is a similar sectional view to FIG. 5 showing the position of the component parts in closed or curing position.

Referring now to FIGS. 2 and 6, the lower mold section 12 is generally circular in planar configuration so as to include a sidewall molding cavity 12a, a registry surface 12b, and a recess 12c, within which the conventional bead ring 20 may be received, with bead ring 20 being secured in place by use of one or more bolts 21,21 and with the entire mold section 12 being secured to a lower platen LP by virtue of bolts 22,22 as clearly shown in the drawings.

Extending radially outward from the peripheral edge of the lower mold section 12 are a series of yoke-like lugs 17,17 having opposed bores 17a,17a within which a pin 16b may be received.

Turning now to FIG. 6 of the drawings for a consideration of the structural characteristics of the upper mold section 11, it will be noted that the same is similarly contoured so as to provide a design-imparting surface 11a for molding the sidewall of the tire, while a registry surface 12b and a recess 12c are similarly provided for the purpose of registering with the arcuate tread mold sectors 14,14 and receiving an upper bead ring 23, with bead ring 23 being secured in position as shown in FIG. 6 by the use of screws 24,24. Again, tapped openings 25,25 are provided for the purpose of attaching the upper mold section to the upper platen (not shown) of the vulcanizing press.

With reference to the press construction, it is believed that this is well known in the art, but in the drawings there is illustrated a construction wherein a bladder B is positioned between the upper and lower mold sections 11 and 12 and held by rings 30 and 40.

Referring now to FIGS. 1 and 2 for a description of the tread mold section 13, it will be noted that preferably each arcuate tread sector 14 is of identical configuration so as to include an upper axial edge 14a and a lower axial edge 14b, with these edge surfaces 14a and 14b being connected on the interior portion of the mold by an inner design-imparting surface 14c and on the outer side by an outer peripheral wall 14d. Further, the arcuate ends of the individual tread sectors 14,14 are defined by end walls 14e,14e as best shown in FIG. 2 of the drawings.

With reference to the upper edge 14a, it will be noted that this is contoured for registering reception within the recess 11b of the upper mold section 11, while the lower edge surface 14b is similarly contoured for reception within the surface 12b of the lower mold surface 12. When the component parts are positioned in the closed position of FIG. 6, it will be noted that the inner molding surfaces 11a, 14c, and 12a in contiguous registry with each other so as to provide an enclosed chamber within which final curing of a pneumatic tire can be achieved.

In addition to the aforementioned component parts, each mold sector 14 includes, adjacent the arcuate ends 14e,14e and the lower edge 14b, a pair of lug members 18,18 that are provided with an appropriate opening therein for reception of the pin 16b, as clearly shown in the drawings. Lug members 18,18 are received between the legs of yoke-like lugs 17,17 and held there by pins 16b,16b. Additionally, for the purposes of effectuating pivoting around this defined hinge point 16, the upper portion of the peripheral wall 14d also includes a projecting lug 26 having an opening therein through which a pin 27 may be received.

For the purpose of providing pivoting movement of tread mold sectors 14,14, the piston 15 includes a yoke connection 28 at the projecting end of arm 15a thereof and is similarly provided with openings through which the pin 27 can be received, with the piston itself being pivotally mounted to appropriate mounting pad 29 that is secured to the lower platen LP in a conventional arrangement.

Figure 5:
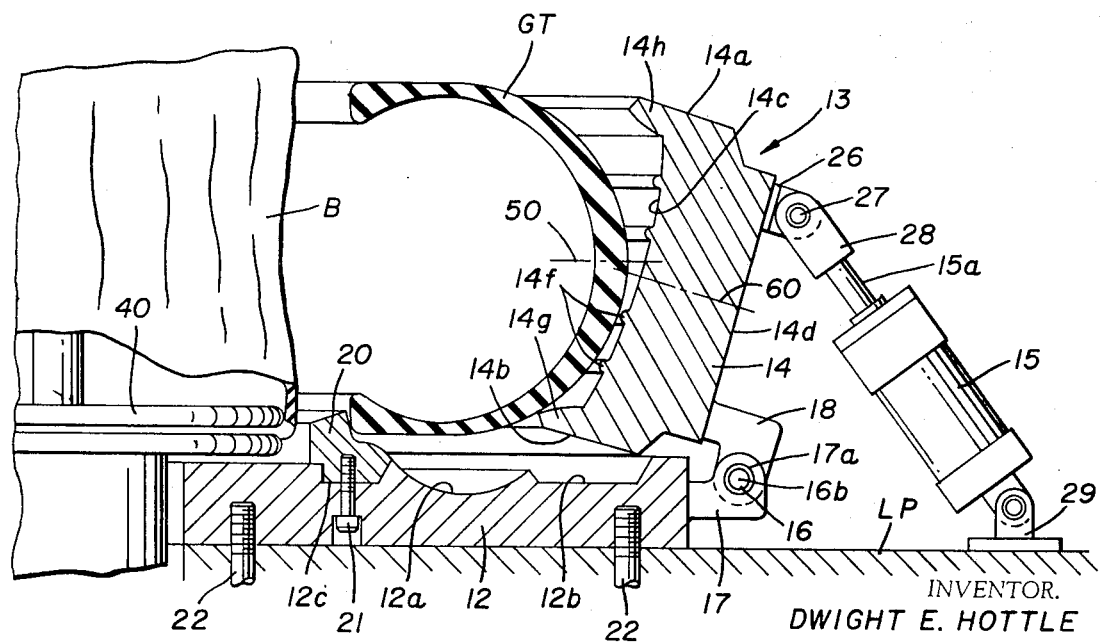
FIG. 5 is a partial sectional view illustrating a green uncured tire received within the segmented mold in open position prior to mold closure and cure.
Figure 3:
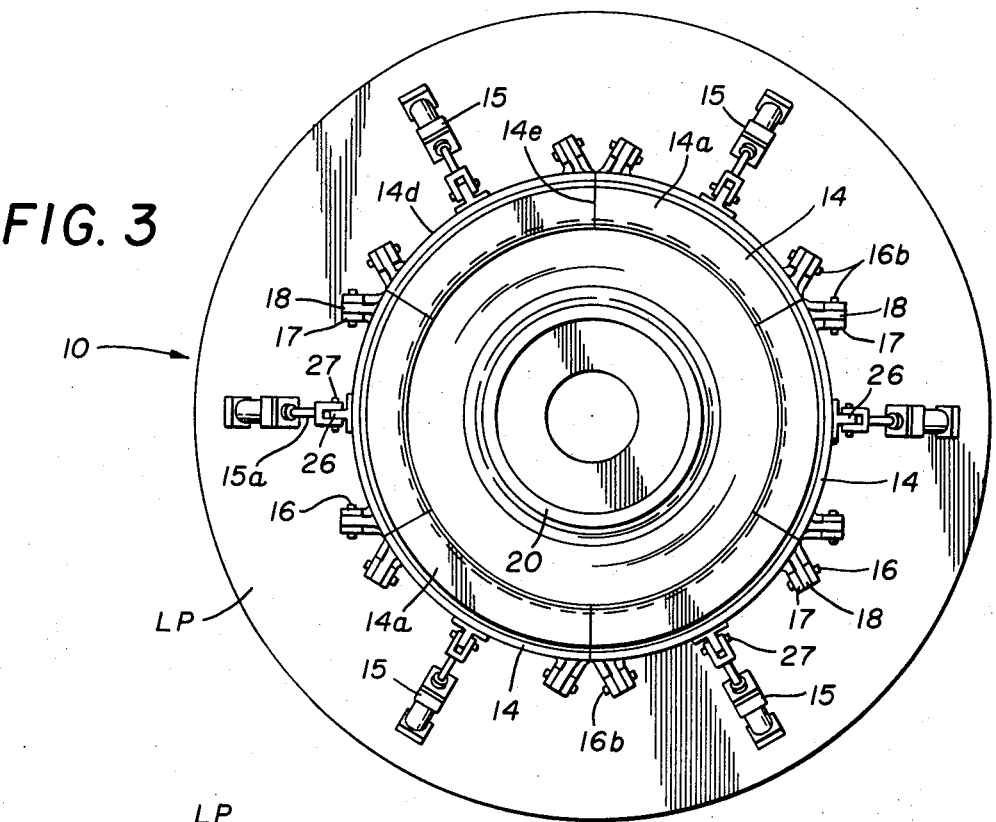
FIGS. 3 and 4 are plan views respectively illustrating the segmented mold in closed and open positions.
Figure 4:
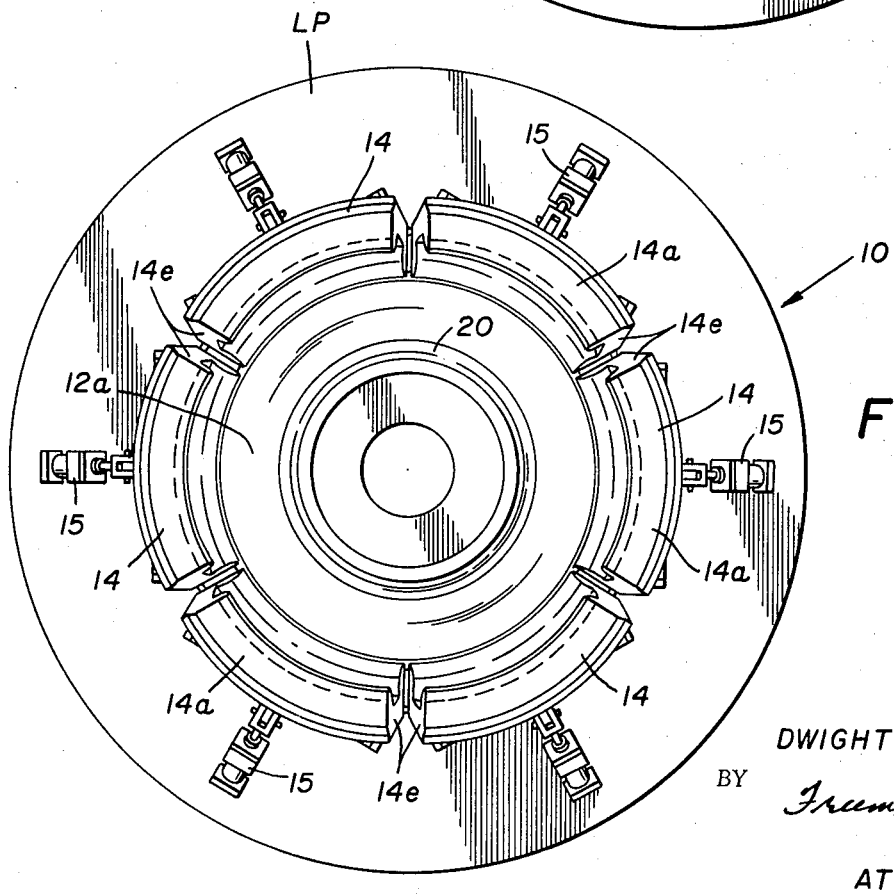

In use or operation of the improved segmented mold 10, it will first be assumed that the component parts have been assembled to the condition shown and, further, that the pistons 15,15 have been actuated and arms 15a,15a have been retracted so as to move the arcuate tread sectors 14,14 to the position of FIG. 5.

At this time a green uncured tire GT may be positioned over the uninflated bladder B, and will be noted that the green tire is resting (see FIG. 5) on one or more of the design-imparting ribs 14f, 14f, with the green tire also being in close adjacency with the crown molding portion 14g. By this arrangement, the longitudinal center line 50 of the tire will be pre-positioned by the cradling effect just described so as to be in alignment with true horizontal. Thus, when the longitudinal center line 60 of the arcuate sectors is moved into the closed position, these center lines 50 and 60 will be in alignment so that an accurately molded tire will result.

Assuming positioning as just described, the pistons 15,15 will then be actuated in unison to move the arcuate sectors 14,14 around the hinge point 16 and into the closed position of FIG. 6.

At this time the bladder B can be inflated to expand into the green tire GT with the design-imparting surfaces that are defined by the bead rings 20 and 23, the upper mold surface 11a, the arcuate tread molding surfaces 14c,14c, the lower mold surface 12a, and the lower bead ring 20. When curing has been completed, the first operation will be to collapse and withdraw the bladder to the position shown in FIG. 7, and following this, the upper platen and the upper mold section 11 attached thereto will be moved away from the remaining components so as to be separated from the tire.

Figure 7:
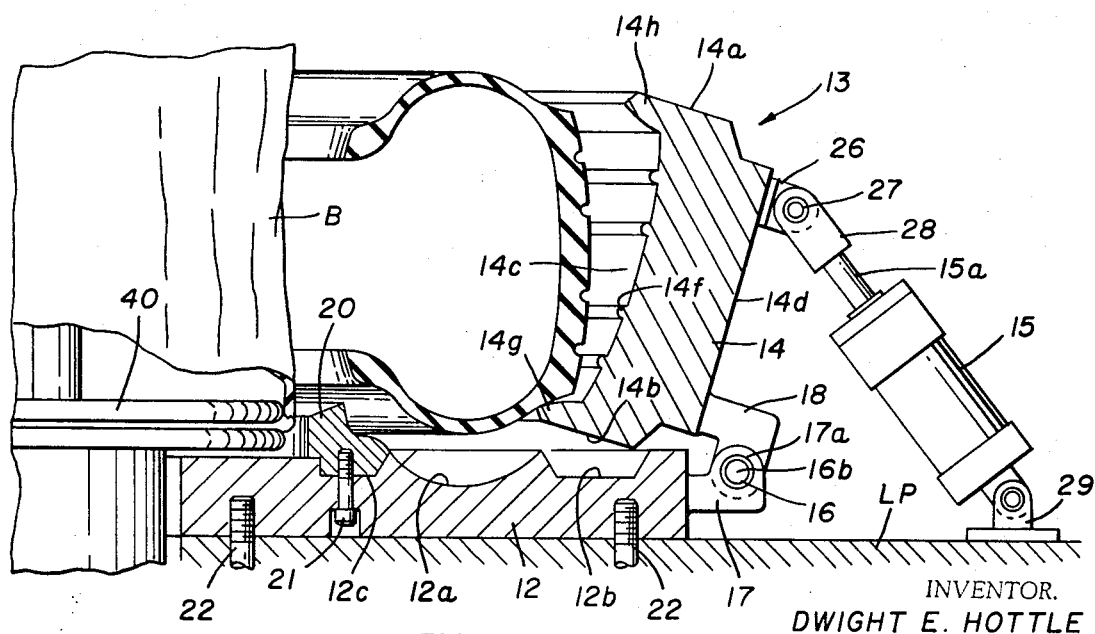
FIG. 7 is a similar sectional view showing the position of the component parts after molding has been completed and the segmented mold has been moved to open position.

At this time the pistons 15,15 can be operated again in unison in the reverse direction to hinge or move the arcuate sectors 14,14 around their common hinge points 16,16 to the position of FIG. 7. During this arrangement it will be noted that the crown mold portions 14g,14g of each sector 14 will engage the crown of the cured tire and will, in effect, cause it to separate from the lower molding surface 12a, as shown in FIG. 7.

At this time manual removal or automatic removal of the tire is readily achieved since the tire has been separated from all mold surfaces and is merely resting on the crown portions 14g,14g as shown in FIG. 7 of the drawings. Furthermore, the tread mold sectors 14,14 will have been pulled out of the way so that the crown mold portions 14h,14h on the top of sectors 14,14 will not interfere with tire removal.

Figure 8:
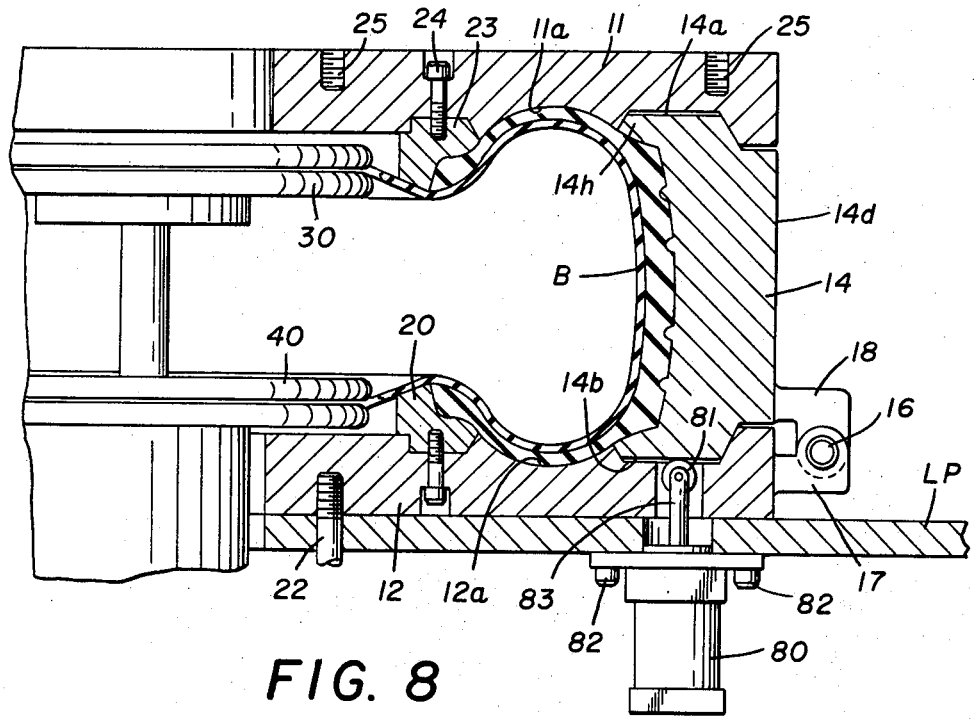
FIGS. 8 and 9 are similar sectional views showing the modified form of the invention in closed and open position, respectively.
Figure 9:
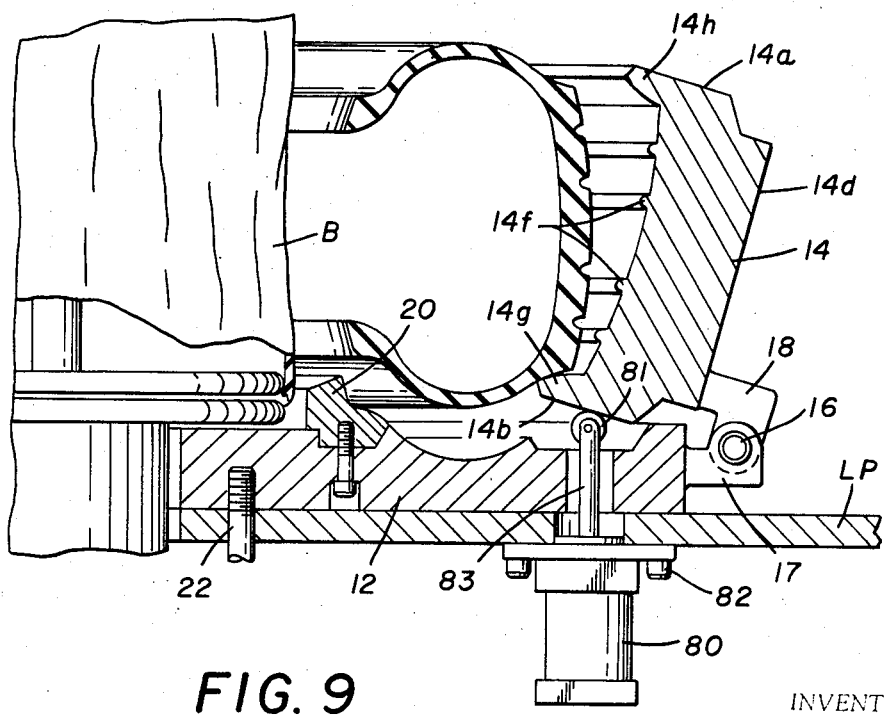

In the modified from of the invention shown in FIGS. 8 and 9, similar type of operation is envisioned except for the fact that a different means of effectuating pivoting is utilized.

Accordingly, in FIGS. 8 and 9 each of the pistons 15,15 of FIGS. 1 through 7 are replaced by an actuating piston 80 is secured to the underside of the lower platen LP and having a roller mechanism 81 on piston arm 83 that is designed to engage the surface 14b of tread mold sector 14, with the piston 80 being secured to the lower platen by appropriate bolts 82,82 and with the piston arm 83 being extendable from the position of FIG. 8 to the position of FIG. 9 in known fashion.

Accordingly, and as shown in FIGS. 8 and 9, upon actuating of the pistons 80,80 to the extended position, the mold sectors 14,14 will again move around pivot point 16 to the open position with a similar result as previously described. Retraction of piston arms 83,83 will likewise permit the sectors to close, as shown in FIG. 8.

It accordingly follows that operation of the device is as previously described, with the exception that a different type of piston arrangement is utilized in this modification of the invention.

While a full and complete description of the invention has been set forth in accordance with the dictates of the Patent Statutes, it is to be understood that the device is not intended to be limited to the specific form or forms shown herein.

Accordingly, modifications of the invention may be resorted to without departing from the spirit hereof or the scope of the appended claims.

What is claimed is:

1. A segmented tire mold of the character described, comprising;
    A. a lower mold section having a sidewall molding surface thereon;
    B. a plurality of arcuate tread mold sectors
        1. having tread molding surfaces and
        2. each being hinged to said lower mold section around at least one fixed pivot point
            a. whereby said tread mold sectors may move between a "closed" position wherein the tread mold surfaces thereof are in contiguous registry with the sidewall molding surfaces, and an "open" position wherein the ends of said tread mold sections are spaced from each other and said sidewall molding surfaces of said first mold section;
    C. means for pivoting said tread mold sectors around said pivot point between said "open" and "closed" positions and moving said sectors both radially and axially with respect to said first mold section, said means being a piston interconnecting the lower mold section with an upper portion of each said tread mold section whereby a lifting movement is performed by said tread molding sections during movement from said "closed" position to said "open" position; and
    D. a second mold section having a sidewall molding surface complemental to said first sidewall mold surface and adapted to be in registry therewith when said tread mold sectors are in said closed position, whereby the molding surfaces of said first mold section, said second mold section, and said arcuate tread sections form a tire molding cavity when in registry with each other.

2. The device of claim 1 further characterized by the fact that each of said tread mold sectors include a radially inwardly projecting surface defining the crown region of said tire; said inwardly projecting surface of said mold sector acting as a pry bar around said hinge point during removal of said tire following vulcanization thereof upon radial and axial movement of said tread mold sectors.

* * * * *